W. J. PETERSON.
TIRE.
APPLICATION FILED AUG. 11, 1913.

1,115,015.

Patented Oct. 27, 1914.

Witnesses:

Inventor
William J. Peterson
By his Attorneys

UNITED STATES PATENT OFFICE.

WILLIAM J. PETERSON, OF BROOKLYN, NEW YORK.

TIRE.

1,115,015. Specification of Letters Patent. Patented Oct. 27, 1914.

Application filed August 11, 1913. Serial No. 784,037.

*To all whom it may concern:*

Be it known that I, WILLIAM J. PETERSON, a citizen of the United States, residing at Brooklyn, county of Kings and State of New York, have invented a new and Improved Tire, of which the following is a specification.

This invention relates to a novel tire for automobiles and similar vehicles, which is so constructed that it possesses great resiliency combined with superior durability, and that it may be readily fitted to a conventional wheel felly.

Figure 1:
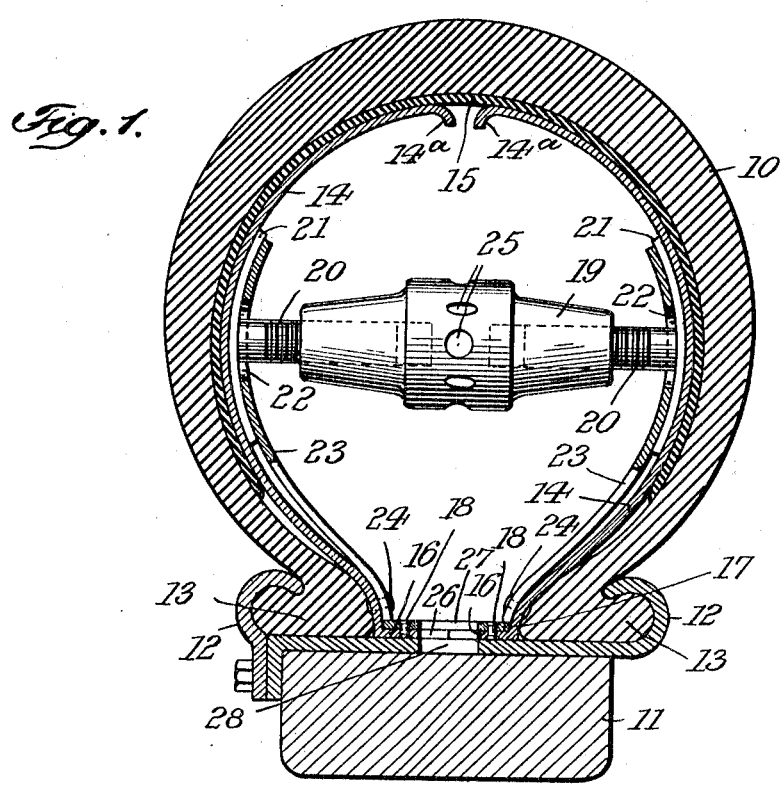
Figure 2:
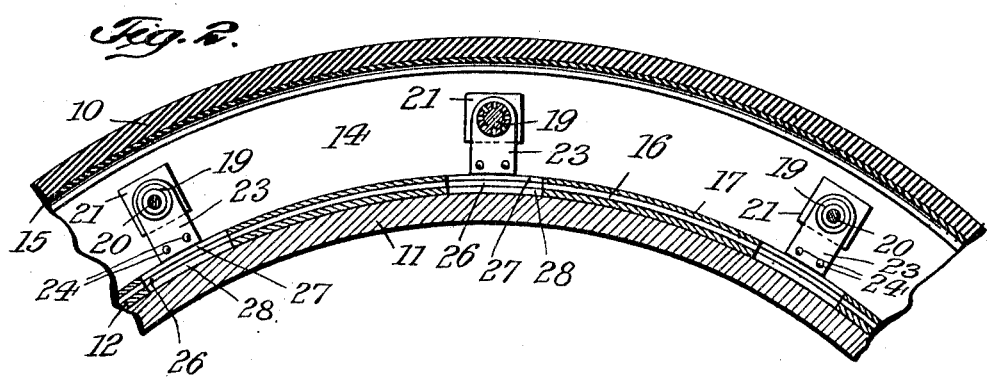
Figures 3, 4:
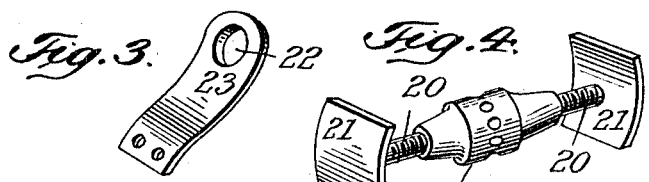

In the accompanying drawing:

Figure 1 is a cross section through a tire embodying my invention; Fig. 2, a longitudinal section thereof, on a reduced scale; Fig. 3, a perspective view of one of the spreader-holding guards; and Fig. 4, a perspective view of one of the turnbuckles and coöperating parts.

The numeral 10 indicates a shoe of conventional construction, which is adapted to be slipped over the wheel felly 11 and is held in position by the usual clamping ring 12 that engages the flanges 13 of shoe 10. Within the latter is contained a pair of resilient load-sustaining members 14 of substantially semi-tubular cross section and preferably made of steel, a suitable canvas lining 15 being interposed between shoe 10 and members 14. Along their spaced outer edges, members 14 are provided with inwardly extending flanges 14ª, while along their inner circumference, members 14 are first curved outward to follow the configuration of shoe 10 and are then bent inward to form a pair of mutually abutting flanges 16, the inner faces of said flanges being flush with the inner faces of shoe-flanges 13. In order to securely hold members 14 in position, a continuous ring or hoop 17 is permanently placed around flanges 16 and is secured thereto by rivets 18.

Diametrically across the semi-tubular members and in a substantially horizontal direction extends a plurality of spreaders, each spreader being composed of a turnbuckle 19 into which are tapped screw stems 20 provided respectively with right hand and left hand threads. Stems 20 carry at their outer ends curved plates 21 that frictionally engage members 14. In order to prevent an accidental displacement of the spreaders, stems 20 are loosely received within corresponding apertures 22 of opposed guards 23 which engage the inner faces of plates 21 and are riveted to members 14 as at 24. Turnbuckles 19 are provided with a plurality of spanner holes 25 for the engagement with a sutiable tool that is adapted to be introduced into shoe 10 through corresponding slots 26, 27, 28 of flanges 16, hoop 17 and ring 12 respectively.

After the slackened tire has been slipped over ring 12, turnbuckles 19 are so set as to impart the desired swell to the tire and to thereby firmly lock flanges 13 to ring 12. The latter is then slipped over felly 11 and secured in position by any suitable means. In order to permit the assemblage of the parts as above described, ring 12 is made sectional as shown.

It will be seen that my improved tire is simple in construction by being made up of but a minimal number of parts, that it is of great resiliency and may be readily applied to a conventional wheel without requiring any particular rim construction.

I claim:

1. A tire comprising a hollow shoe, a pair of opposed resilient load-sustaining members of substantially semi-tubular cross section fitted into said shoe, a turnbuckle, a pair of screw stems engaged thereby, and plates on said stems that frictionally engage the resilient members.

2. A tire comprising a hollow shoe, a pair of opposed resilient load-sustaining members of substantially semi-tubular cross section fitted into said shoe, a spreader composed of a turnbuckle, a pair of screw stems engaged thereby, and plates on said stems that frictionally engage the resilient members, and means for holding said spreader in position.

3. A tire comprising a hollow shoe, a pair of opposed resilient load-sustaining members of substantially semi-tubular cross section fitted into said shoe, a turnbuckle, a pair of screw stems engaged thereby, plates on said stems that frictionally engage the resilient members, and a pair of guards secured to said members and being provided with apertures for accommodating the screw stems.

4. A tire comprising a hollow shoe, a pair of opposed resilient load-sustaining members of substantially semi-tubular cross section fitted into said shoe, mutually abutting slotted flanges formed along the inner circumference of said members, a slotted hoop surrounding the flanges and secured thereto, a plurality of turnbuckles having spanner
5 holes, screw stems engaged by the turnbuckles, and plates on said stems that frictionally engage the resilient members, the slots formed in the flanges and hoop permitting the introduction of a tool into the spanner holes of the turnbuckles.

WILLIAM J. PETERSON.

Witnesses:
ARTHUR E. ZUMPE,
FRIEDA ELMAN.

Copies of this patent may be obtained for five cents each, by addressing the "Commissioner of Patents, Washington, D. C."